US012730784B2

(12) United States Patent
Liao et al.

(10) Patent No.: US 12,730,784 B2
(45) Date of Patent: Sep. 8, 2026

(54) REACH DEDUPLICATION ACROSS CONTENTS

(71) Applicant: Lemon Inc., Grand Cayman (KY)

(72) Inventors: Ruojia Liao, Los Angeles, CA (US); Yuntong Xiao, Los Angeles, CA (US); Lu Han, Los Angeles, CA (US); Jinhui Zhao, Los Angeles, CA (US); Jun Ma, Los Angeles, CA (US); Yichuan Wang, Los Angeles, CA (US); Megha Agrawal, Los Angeles, CA (US); James Thygesen, Los Angeles, CA (US); Jiali Fan, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/988,389

(22) Filed: Dec. 19, 2024

(65) Prior Publication Data

US 2026/0178550 A1 Jun. 25, 2026

(51) Int. Cl.
*G06F 16/00* (2019.01)
*G06F 16/215* (2019.01)

(52) U.S. Cl.
CPC .................................. *G06F 16/215* (2019.01)

(58) Field of Classification Search
None
See application file for complete search history.

(56) References Cited

PUBLICATIONS

Song et el. (CN-111046287-B), "Push Method Of User Production Content And Server", Sep. 11, 2020, 24 Pages. (Year: 2020).*

Feng et l. (CN-117692692-A), "Display Method, Device, Electronic Device And Computer Readable Medium", Mar. 12, 2024, 26 Pages. (Year: 2024).*

Yu et al. (CN-109753993-A), "User Portrait Method, Device, Computer-readable Storage Medium And Electronic Equipment", May 14, 2019, 23 Pages. (Year: 2019).*

Wang et al. (TW-1709927-B), "Method And Device For Determining Target User Group", Nov. 11, 2020, 13 Pages. (Year: 2020).*

Jiao et al. (CN-105550903-B), "Target User Determining Method And Device", Jul. 30, 2021, 21 Pages. (Year: 2021).*

* cited by examiner

*Primary Examiner* — Bai D Vu
(74) *Attorney, Agent, or Firm* — Alleman Hall LLP

(57) ABSTRACT

A method, device and computer readable storage medium for reach deduplication across contents is provided. In the method, a plurality of non-overlapping object subsets is determined from an object set based on a plurality of object ranges. An object range is associated with at least one object attribute and targeted by a content of a plurality of contents that targets the object set. A reference number of objects targeted by at least one content in each object subset is determined based on a plurality of individual correlation metrics. An individual correlation metric corresponds to a content and indicates a degree of correlation between objects in the object subset and the content. A target number of objects targeted by the plurality of contents in the object set is determined based on the respective reference numbers in the plurality of object subsets.

20 Claims, 4 Drawing Sheets

200

210
DETERMINE, FROM AN OBJECT SET, A PLURALITY OF OBJECT SUBSETS BASED ON A PLURALITY OF OBJECT RANGES TARGETED BY A PLURALITY OF CONTENTS TO BE DELIVERED TO OBJECTS IN THE OBJECT SET, AN OBJECT RANGE OF THE PLURALITY OF OBJECT RANGES BEING ASSOCIATED WITH AT LEAST ONE OBJECT ATTRIBUTE AND TARGETED BY A CONTENT OF THE PLURALITY OF CONTENTS, AND THE PLURALITY OF OBJECT SUBSETS BEING NON-OVERLAPPING WITH EACH OTHER

220
DETERMINE, IN EACH OF THE PLURALITY OF OBJECT SUBSETS, A REFERENCE NUMBER OF OBJECTS BASED ON A PLURALITY OF INDIVIDUAL CORRELATION METRICS CORRESPONDING TO THE PLURALITY OF CONTENTS, AT LEAST ONE OF THE PLURALITY OF CONTENTS BEING TO BE DELIVERED TO THE REFERENCE NUMBER OF OBJECTS, AND AN INDIVIDUAL CORRELATION METRIC OF THE PLURALITY OF INDIVIDUAL CORRELATION METRICS CORRESPONDING TO A CONTENT OF THE PLURALITY OF CONTENTS AND INDICATING A DEGREE OF CORRELATION BETWEEN OBJECTS IN THE OBJECT SUBSET AND THE CONTENT

230
DETERMINE, IN THE OBJECT SET, A TARGET NUMBER OF OBJECTS BASED ON THE RESPECTIVE REFERENCE NUMBERS DETERMINED FOR THE PLURALITY OF OBJECT SUBSETS, THE PLURALITY OF CONTENTS BEING TO BE DELIVERED TO THE TARGET NUMBER OF OBJECTS

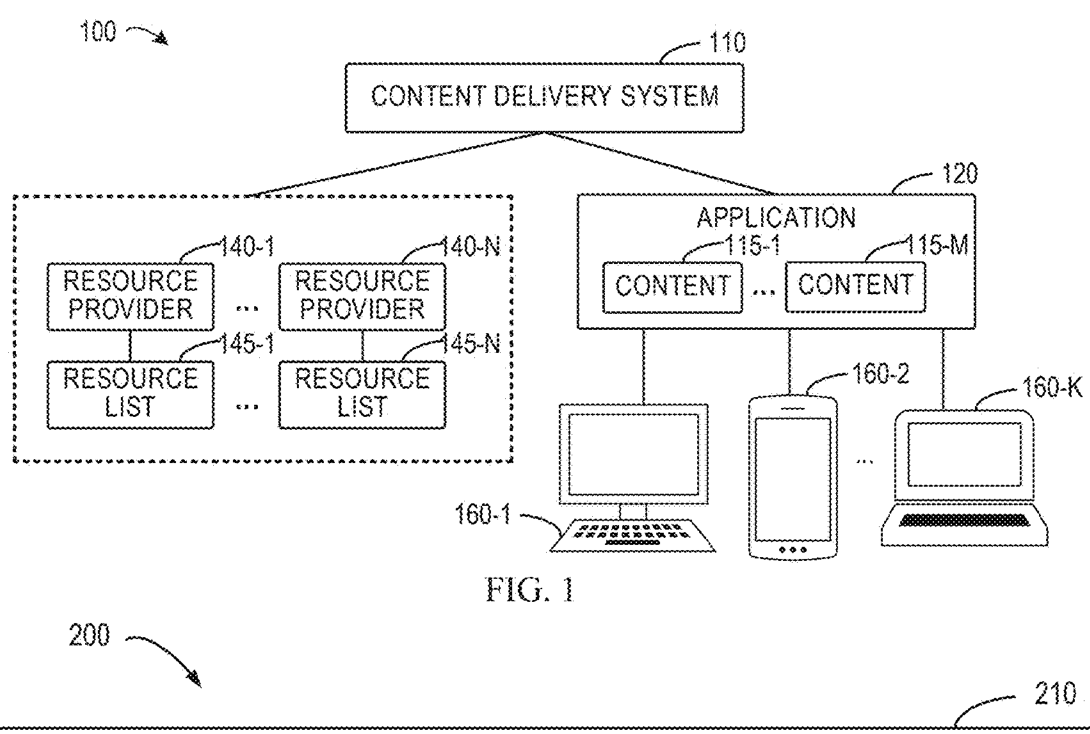

DETERMINE, FROM AN OBJECT SET, A PLURALITY OF OBJECT SUBSETS BASED ON A PLURALITY OF OBJECT RANGES TARGETED BY A PLURALITY OF CONTENTS TO BE DELIVERED TO OBJECTS IN THE OBJECT SET, AN OBJECT RANGE OF THE PLURALITY OF OBJECT RANGES BEING ASSOCIATED WITH AT LEAST ONE OBJECT ATTRIBUTE AND TARGETED BY A CONTENT OF THE PLURALITY OF CONTENTS, AND THE PLURALITY OF OBJECT SUBSETS BEING NON-OVERLAPPING WITH EACH OTHER

220

DETERMINE, IN EACH OF THE PLURALITY OF OBJECT SUBSETS, A REFERENCE NUMBER OF OBJECTS BASED ON A PLURALITY OF INDIVIDUAL CORRELATION METRICS CORRESPONDING TO THE PLURALITY OF CONTENTS, AT LEAST ONE OF THE PLURALITY OF CONTENTS BEING TO BE DELIVERED TO THE REFERENCE NUMBER OF OBJECTS, AND AN INDIVIDUAL CORRELATION METRIC OF THE PLURALITY OF INDIVIDUAL CORRELATION METRICS CORRESPONDING TO A CONTENT OF THE PLURALITY OF CONTENTS AND INDICATING A DEGREE OF CORRELATION BETWEEN OBJECTS IN THE OBJECT SUBSET AND THE CONTENT

230

DETERMINE, IN THE OBJECT SET, A TARGET NUMBER OF OBJECTS BASED ON THE RESPECTIVE REFERENCE NUMBERS DETERMINED FOR THE PLURALITY OF OBJECT SUBSETS, THE PLURALITY OF CONTENTS BEING TO BE DELIVERED TO THE TARGET NUMBER OF OBJECTS

FIG. 2

REACH DEDUPLICATION ACROSS CONTENTS

FIELD

The present disclosure generally relates to computer technologies, and more specifically, to a method, device and computer readable storage medium for reach deduplication across contents.

BACKGROUND

With development of network technologies, various types of contents (such as videos, images, audios, web pages, etc.) may be accessed via a network. The content may be related to various resources. For example, these resources may include physical products such as electronic devices, furniture, clothes, shoes, and the like. As another example, these resources may include virtual products, for example, including applications that may be installed in electronic devices, audio and video content that may be played in electronic devices, and the like. Resource providers (such as online shopping websites for the physical products or producers of the virtual products) may publish promotion contents (such as video advertisements) for their resources.

SUMMARY

In a first aspect of the present disclosure, there is provided a method of content management. The method comprises: determining, from an object set, a plurality of object subsets based on a plurality of object ranges targeted by a plurality of contents to be delivered to objects in the object set, an object range of the plurality of object ranges being associated with at least one object attribute and targeted by a content of the plurality of contents, and the plurality of object subsets being non-overlapping with each other; determining, in each of the plurality of object subsets, a reference number of objects based on a plurality of individual correlation metrics corresponding to the plurality of contents, at least one of the plurality of contents being to be delivered to the reference number of objects, and an individual correlation metric of the plurality of individual correlation metrics corresponding to a content of the plurality of contents and indicating a degree of correlation between objects in the object subset and the content; and determining, in the object set, a target number of objects based on the respective reference numbers determined for the plurality of object subsets, the plurality of contents being to be delivered to the target number of objects.

In a second aspect of the present disclosure, there is provided an electronic device. The electronic device comprises: at least one processing unit; and at least one memory coupled to the at least one processing unit and storing instructions executable by the at least one processing unit, the instructions, upon execution by the at least one processing unit, causing the electronic device to perform acts comprising: determining, from an object set, a plurality of object subsets based on a plurality of object ranges targeted by a plurality of contents to be delivered to objects in the object set, an object range of the plurality of object ranges being associated with at least one object attribute and targeted by a content of the plurality of contents, and the plurality of object subsets being non-overlapping with each other; determining, in each of the plurality of object subsets, a reference number of objects based on a plurality of individual correlation metrics corresponding to the plurality of contents, at least one of the plurality of contents being to be delivered to the reference number of objects, and an individual correlation metric of the plurality of individual correlation metrics corresponding to a content of the plurality of contents and indicating a degree of correlation between objects in the object subset and the content; and determining, in the object set, a target number of objects based on the respective reference numbers determined for the plurality of object subsets, the plurality of contents being to be delivered to the target number of objects.

In a third aspect of the present disclosure, a computer-readable storage medium is provided. The computer-readable storage medium stores computer executable instructions which, when executed by an electronic device, causes the electronic device perform acts comprising: determining, from an object set, a plurality of object subsets based on a plurality of object ranges targeted by a plurality of contents to be delivered to objects in the object set, an object range of the plurality of object ranges being associated with at least one object attribute and targeted by a content of the plurality of contents, and the plurality of object subsets being non-overlapping with each other; determining, in each of the plurality of object subsets, a reference number of objects based on a plurality of individual correlation metrics corresponding to the plurality of contents, at least one of the plurality of contents being to be delivered to the reference number of objects, and an individual correlation metric of the plurality of individual correlation metrics corresponding to a content of the plurality of contents and indicating a degree of correlation between objects in the object subset and the content; and determining, in the object set, a target number of objects based on the respective reference numbers determined for the plurality of object subsets, the plurality of contents being to be delivered to the target number of objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where:

FIG. 1 illustrates a schematic diagram of an example environment in which embodiments of the present disclosure may be implemented;

FIG. 2 illustrates a flowchart of a process of reach deduplication across contents in accordance with some embodiments of the present disclosure;

DETAILED DESCRIPTION

Figures 3, 4:
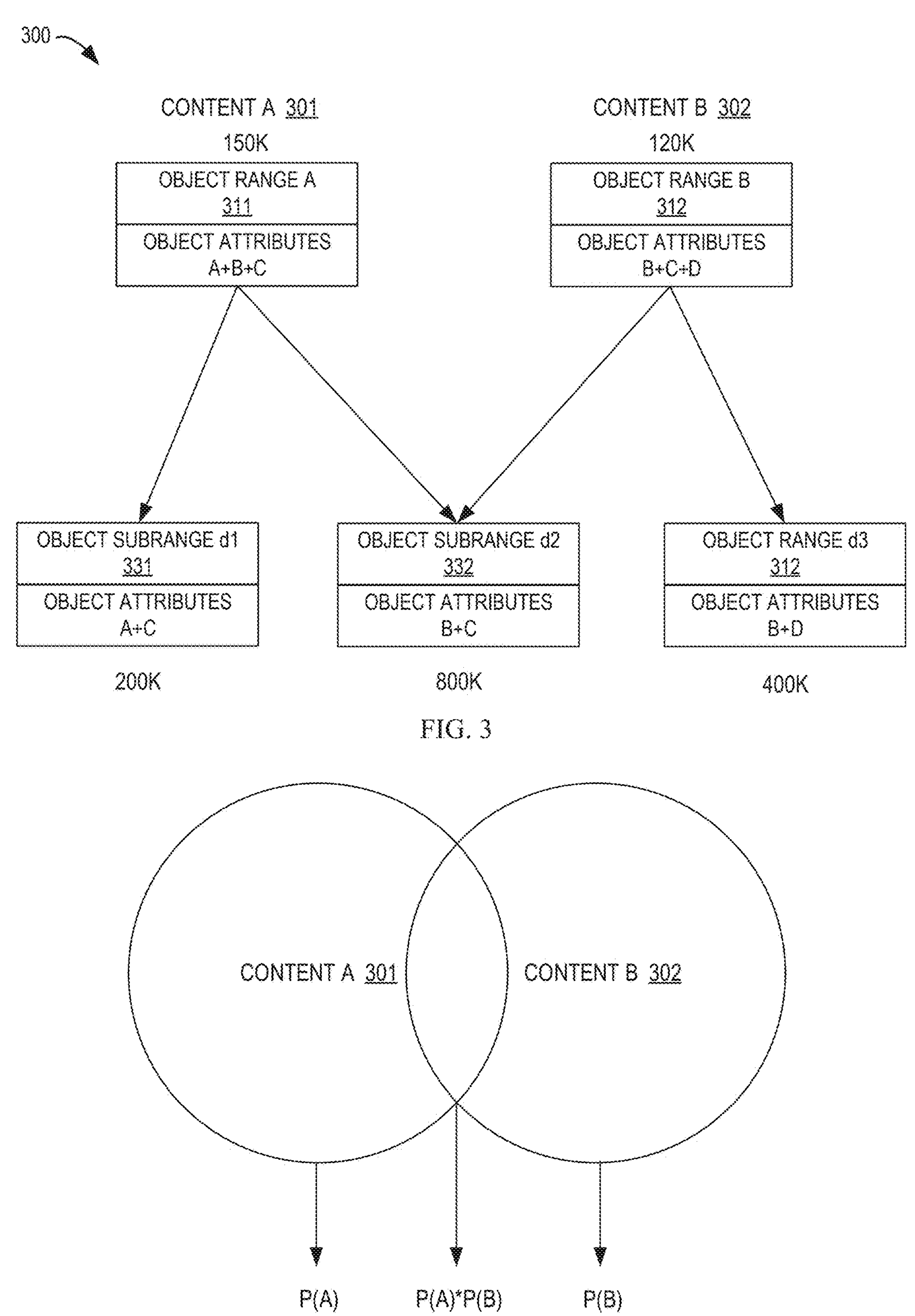
FIG. 3 illustrates a schematic diagram of an example process of reach deduplication across contents in accordance with some embodiments of the present disclosure.
FIG. 4 illustrates a schematic diagram of a percentage of objects reached by two contents in accordance with some embodiments of the present disclosure.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below. As used herein, the term "model" can represent the matching degree between various data. For example, the above matching degree can be obtained based on various technical solutions currently available and/or to be developed in the future.

It will be appreciated that the data involved in this technical proposal (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, and the user's authorization should be obtained.

For example, in response to receiving an active request from a user, a prompt message is sent to the user to explicitly prompt the user that the operation requested operation by the user will need to obtain and use the user's personal information. Thus, users may select whether to provide personal information to the software or the hardware such as an electronic device, an application, a server or a storage medium that perform the operation of the technical solution of the present disclosure according to the prompt information.

As an optional but non-restrictive implementation, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

FIG. 1 illustrates a schematic diagram of an example environment 100 in which embodiments of the present disclosure may be applied. In FIG. 1, one or more resource providers 140-1, . . . , 140-N may request a content delivery system 110 to manage contents 115-1, . . . , 115-M that are to be displayed in an application 120. N and M represent positive integers. For the purpose of discussion, the resource providers 140-1, . . . , 140-N and the contents 115-1, . . . , 115-M will be collectively or individually referred to as the resource provider(s) 140 and the content(s) 115. The resource providers 140-1, . . . , 140-N may have resource lists 145-1, . . . , 145-N. Each of the resource providers 140-1, . . . , 140-N may generate one or more contents related to a resource in its resource list and request the content delivery system 110 to deliver the one or more contents to on a plurality of terminal devices 160-1, 160-2, . . . , 160-K (collectively or individually referred to as the terminal device(s) 160 for discussion) for display in the application 120. K represents a positive integer. Users of the application 120 may access the contents 115-1, . . . , 115-M via the terminal devices 160. The resource providers 140-1, . . . , 140-N may generate the contents 115-1, . . . , 115-M in a variety of formats, for example, including but not be limited to video, text, image, audio, and webpage formats.

It should be understood that the structure and function of each element in the environment 100 is described for illustrative purposes only and does not imply any limitations on the scope of the present disclosure.

In the environment 100, the plurality of contents 115 may be delivered to reach a plurality of objects (e.g., enterprise users, organization users or application users) where different contents related to one or more resources may reach the same object. In some scenarios, there is a need to estimate or predict the total number of objects to which a plurality of contents related to one or more resources have been reached, for example, to evaluate the delivery policy and/or delivery results of the contents. The total number may be calculated based on a sum of the number of objects to which each of the contents has been reached. If more than one content has reached the same object, object deduplication is needed to determine an accurate total number of objects.

One approach is based on delivery simulation. For example, a real-world content delivery process may be mimicked to determine a forecasted reach of the contents. This approach may include simulating delivery processes of all the contents related to one or more resources, and identifying and removing the duplicated objects. However, this approach requires complex simulation logic and heavy computation resources. The simulation logic may need to be implemented as per each characteristic of the resources separately. Due to the complexity of the content delivery system 110, it is difficult to complete the simulation in real-time with low latency. Further, there may be hard limitations on some specific resources such as auction-based products. For the auction-based products, since the real-time competing environment may be a factor of the auction result, it is almost impossible to simulate such products in advance.

It may require an object-level identity resolution to identify and remove the duplicated objects. If a unified object identifier (ID) exists across different resources, object counting and deduplicating may be based on the object IDs. However, this requires real-time, granular forecasting at a level of object IDs. Given massive objects, it may be very difficult or even impractical to perform deduplication at the level of object IDs without introducing unacceptable latency. Similar approaches may include using device tracking or cookie matching to identify the same object. However, this faces similar challenges to the object-level identity resolution.

Embodiments of the present disclosure propose a solution of predicting the number of deduplicated objects. This solution is based on conditional independence assumption (CIA) that if the size of reachable objects is large enough, an object is independently exposed to different contents that are related to one or more resources, given an object range which may depend on statistics about object attributes. The object attributes may comprise any attribute of an object that may be used to define a plurality of object ranges targeted by a plurality of contents and further divide an object set into a plurality of non-overlapping object subsets based on the plurality of object ranges. For example, if the objects are enterprise users or organization users, the object attributes may comprise a size, a business domain and/or the like of an enterprise or an organization. As another example, if the objects are application users, the object attributes may comprise a version, a language type, and/or the like of an application.

In this solution, for each of the non-overlapping object subsets, the number of objects (referred to as a reference number of objects) to which at least one of the plurality of contents is to be delivered is determined based on a plurality of individual correlation metrics corresponding to the plurality of contents. An individual correlation metric of the individual correlation metrics indicates a degree of correlation between objects in the object subset and a corresponding content of the contents. The number of objects (referred to as a target number of objects) to which the plurality of contents is to be delivered in one of the object subset is determined based on the respective reference numbers of objects determined for the plurality of object subsets.

This solution calculates the number of objects in an object set based on individual forecasts for respective object sets, which may increase the accuracy of object counting and deduplicating. Moreover, the computational cost and overall latency may be reduced for the object counting and deduplicating.

FIG. 2 illustrates a flowchart of a process 200 for reach deduplication across contents in accordance with some embodiments of the present disclosure. The process 200 may be implemented at the content delivery system 110 or the terminal device 160 of FIG. 1 or any other computing device that is able to access or obtain data for object counting and deduplicating. The process 200 is described with reference to FIG. 1 as an example.

At block 210, a plurality of object subsets, which are non-overlapping with each other, are determined from an object set based on a plurality of object ranges targeted by a plurality of contents to be delivered to objects in the object set. Each of the plurality of object ranges is associated with at least one object attribute and is targeted by one of the contents. As described above, the object attributes may comprise any attribute of an object that may be used to define the plurality of object ranges targeted by the plurality of contents and further divide an object set into a plurality of non-overlapping object subsets based on the plurality of object ranges.

In some embodiments, the plurality of object ranges may be re-divided into a plurality of non-overlapping object subranges, and one of the non-overlapping object subsets may be determined to correspond to one of the non-overlapping object subranges. For example, an aggregated object range may be determined based on the plurality of object ranges and then divided into a plurality of object subranges that are non-overlapping with each other. Objects in the object set may be assigned to the plurality of object subranges based on respective object attributes of the objects, to obtain the corresponding non-overlapping object subsets.

By way of example, as shown in FIG. 3, two contents associated with the same resource or different resources, including a content A 301 and a content B 302, target an object range A 311 and an object range B 312, respectively. The object range A 311 is associated with an object attribute A, an object attribute B, and an object attribute C. The object range B 312 is associated with the object attribute B, the object attribute C and an object attribute D. Some of the object attributes may be mutually exclusive. For example, the object attribute A and the object attribute B may be mutually exclusive. The object attribute C and the object attribute D may be mutually exclusive. Based on these associated object attributes, an aggregated object range of the object range A 311 and the object range B 312, which may be a union of the two object ranges, may be divided into three non-overlapping object subranges, which include an object subrange d1 331 associated with the object attribute A and the object attribute C, an object subrange d2 332 associated with the object attribute B and the object attribute C, and an object subrange d3 333 associated with the object attribute B and the object attribute D. Accordingly, three object subsets may be determined to correspond to the three non-overlapping object subranges, respectively.

Still with reference to FIG. 2, at block 220, a reference number of objects, to which at least one of the plurality of contents is to be delivered, is determined in each of the plurality of object subsets based on a plurality of individual correlation metrics. An individual correlation metric of the plurality of individual correlation metrics corresponds to a content of the plurality of contents and indicates a degree of correlation between objects in the object subset and the content.

The individual correlation metric may be implemented in any suitable form. In some embodiments, an individual correlation metric corresponding to a content may comprise a probability that the content reaches objects in the object subset. The three object subsets corresponding to the object subrange d1 331, the object subrange d2 332 and the object subrange d3 333 in FIG. 3 may be taken as an example. In this example, for an object subset of the three object subsets, represented by d, an individual correlation metric corresponding to the content A 301 may be a probability that the content A 301 reaches objects in the object subset d, which may be represented by $P_d(A)$. An individual correlation metric corresponding to the content B 302 may be a probability that the content B 302 reaches objects in the object subset d, which may be represented by $P_d(B)$.

In an example, $P_d(A)$ and $P_d(B)$ may be calculated as follows:

$$P_d(A) = \text{Reach}_{total}(A)/N_d, \tag{1}$$

$$P_d(B) = \text{Reach}_{total}(B)/N_d. \tag{2}$$

where $\text{Reach}_{total}(A)$ represents a total number of objects to which the content A 301 is to be delivered in the object set, and Na represents a total number of objects in the object set.

In some embodiments, an individual correlation metric corresponding to a content may be determined for an object set considering a matching degree between the object set and an object range targeted by the content. For example, the matching degree may depend on whether an object and/or how many objects in the object set are targeted by the content. In an example, it may be determined whether the content is to be delivered to at least one object in the object subset. If the content is to be delivered to at least one object in the object subset, a value of the matching degree may be determined as one '1' to indicate that the object subset matches the object range targeted by the content. If the content is not to be delivered to an object in the object subset, that is, no object in the object subset is targeted by the content, then a value of the matching degree may be determined as zero '0' to indicate that the object subset does not match the object range targeted by the content.

In addition to the matching degree between the object set and an object range targeted by the content, the following may be determined: a number of objects (referred to as a first number) to which the content is to be delivered in the object set, and a number of objects (referred to as a second number) in one or more object sets of the plurality of object sets corresponding to the object range targeted by the content. Then, the individual correlation metric corresponding to the content may be determined based on the matching degree, the first number and the second number.

As an example, it is assumed that probabilities that a content reaches different object subsets are equal. In this case, in the example as shown in FIG. 3, a probability that the content A 301 reaches objects in the object subset d, i.e., $P_d(A)$, and a probability that the content B 302 reaches objects in the object subset d, i.e., $P_d(B)$, may be calculated as follows:

$$P_d(A) = I_d * \text{Reach}_{total}(A) \Big/ \sum\nolimits_{targeted_A} N_d, \tag{3}$$

$$P_d(A) = I_d * \text{Reach}_{total}(A) \Big/ \sum\nolimits_{targeted_A} N_d, \tag{4}$$

where $I_d(A)$ represents a matching degree between the object set d and an object range targeted by the content A 301, which may indicate whether the object set corresponds to the object subrange d1 331 and the object subrange d2 332 targeted by the content A 301. $\text{Reach}_{total}(A)$ represents a total number of objects (i.e., an example of the first number) to which the content A 301 is to be delivered in the object set. $\Sigma_{targeted_A} N_d$ represents a total number of objects (i.e., an example of the second number) in the object subsets corresponding to the object subrange d1 331 and the object subrange d2 332 targeted by the content A 301.

After the plurality of individual correlation metrics corresponding to the plurality of contents to be delivered are determined for an object subset, a reference number of objects in the object subset to which the contents are to be delivered may be determined based on the individual correlation metrics. In some embodiments, the reference number of objects in the object subset may be determined based on a joint correlation metric indicating a degree of correlation between the objects in the object subset and the plurality of contents. The joint correlation metric for the plurality of contents may be determined based on the plurality of individual correlation metrics corresponding to the plurality of contents.

In some embodiments, the joint correlation metric for the plurality of contents may be related to a concurrent correlation metric that indicates a degree of correlation between the objects in the object subset and both the first and second contents. By way of example, in some embodiments where the plurality of contents comprises a first content and a second content, such as the content A 301 and the content B 302 in FIG. 3, a concurrent correlation metric for the first and second contents may be determined based on a first individual correlation metric corresponding to the first content and a second individual correlation metric corresponding to the second content. For example, by taking $P_d(A)$ and $P_d(B)$ as examples of the first individual correlation metric and the second individual correlation metric, the concurrent correlation metric for the content A 301 and the content B 302 may be calculated as $P_d(A)*P_d(B)=P_d(A \cap B)$ which represents a percentage of objects reached by both the content A 301 and the content B 302 in the object subset d, as shown in FIG. 4.

Then, the joint correlation metric may be determined based on the first individual correlation metric, the second individual correlation metric and the concurrent correlation metric, where the first and second individual correlation metrics have a positive contribution to the joint correlation metric and the concurrent correlation metric has a negative contribution to the joint correlation metric. $P_d(A)$ and $P_d(B)$ will still be taken as examples of the first individual correlation metric and the second individual correlation metric. Within the object subset d, the joint correlation metric for the content A 301 and the content B 302 may be calculated as follows:

$$P_d(A \cup B) = P_d(A) + P_d(B) - P_d(A) * P_d(B), \tag{5}$$

where $P_d(A \cup B)$ represents a cross-reach rate of both the content A 301 and the content B 302.

Further, the reference number of objects to which at least one content of the plurality of contents may be determined based on the joint correlation metric and a number of objects within the object subset (represented by $N_d$), as follows:

$$\text{Reach}_d = P_d(A \cup B) * N_d, \tag{6}$$

where $\text{Reach}_d$ represents the number of objects to which both the content A 301 and the content B 302 are to be delivered.

Next, as shown in FIG. 2, at block 230, the target number of objects to which the plurality of contents is to be delivered in the object set is determined based on the respective reference numbers determined for the plurality of object subsets. Taking the scenario as shown in FIG. 3 as an example, the target number of objects to which both the content A 301 and the content B 302 are to be delivered in the object set may be calculated as follows:

$$\text{Reach}_{est}(A, B) = \sum\nolimits_{targeted} \text{Reach}_d. \tag{7}$$

An example process for reach deduplication across contents will be described below with reference to FIG. 3. In a process 300, the total predicted (or forecast) reaches (e.g., the number of targeted objects) of the content A 301 is 150K, and the total predicted reaches of the content B 302 is 120K. To estimate the reaches across the contents, the reach estimates for the three object subsets corresponding to the object subrange d1 331, the object subrange d2 332 and the object subrange d3 332 may be summed up where the three object subsets include 200K, 800K and 400K objects, respectively.

The object subrange d1 331 is only targeted by the content A 331, and the joint reach probability of the content A 301 and the content B 302 is equal to the reach probability 0.15 of the content A 301 as below:

$$P_{d1}(A) = 1 * 150\text{K}/(200\text{K} + 800\text{K}) = 0.15, \tag{8}$$
$$P_{d1}(B) = 0 * 120\text{K}/(800\text{K} + 400\text{K}) = 0,$$
$$P_{d1}(A \cup B) = P_{d1}(A) + P_{d1}(B) - P_{d1}(A) * P_{d1}(B) = 0.15.$$

Reaches on the object subset corresponding to the object subrange d1 331 is 30K given the total number of objects in the object subset is 200K, as below:

$$\text{Reach} = P_{d1}(A \cup B) * N_{d1} = 0.15 * 200\text{K} = 30\text{K}. \tag{9}$$

The object subrange d2 332 is targeted by both the content A 331 and the content B 332, and its joint reach probability is 0.235 as below:

$$P_{d2}(A) = 1 * 150\text{K}/(200\text{K} + 800\text{K}) = 0.15, \tag{10}$$
$$P_{d2}(B) = 1 * 120\text{K}/(800\text{K} + 400\text{K}) = 0.1,$$
$$P_{d2}(A \cup B) = P_{d2}(A) + P_{d2}(B) - P_{d2}(A) * P_{d2}(B) = 0.235.$$

Reaches on the object subset corresponding to the object subrange d2 332 is 188K given the total number of objects in the object subset is 800K, as below:

$$\text{Reach} = P_{d2}(A \cup B) * N_{d2} = 0.235 * 800\text{K} = 188\text{K}. \tag{11}$$

The object subrange d3 333 is only targeted by the content B 332, and the joint reach probability of the content A 301 and the content B 302 is equal to the reach probability 0.1 of the content B 302 as below:

$$P_{d3}(A) = 0 * 150\text{K}/(200\text{K} + 800\text{K}) = 0, \tag{12}$$
$$P_{d3}(B) = 1 * 120\text{K}/(800\text{K} + 400\text{K}) = 0.1,$$
$$P_{d3}(A \cup B) = P_{d3}(A) + P_{d3}(B) - P_{d3}(A) * P_{d3}(B) = 0.1.$$

Reaches on the object subset corresponding to the object subrange d3 333 is 40K given the total number of objects in the object subset is 400K, as below:

$$\text{Reach} = P_{d3}(A \cup B) * N_{d3} = 0.1 * 400\text{K} = 40\text{K}. \tag{13}$$

Figure 5:
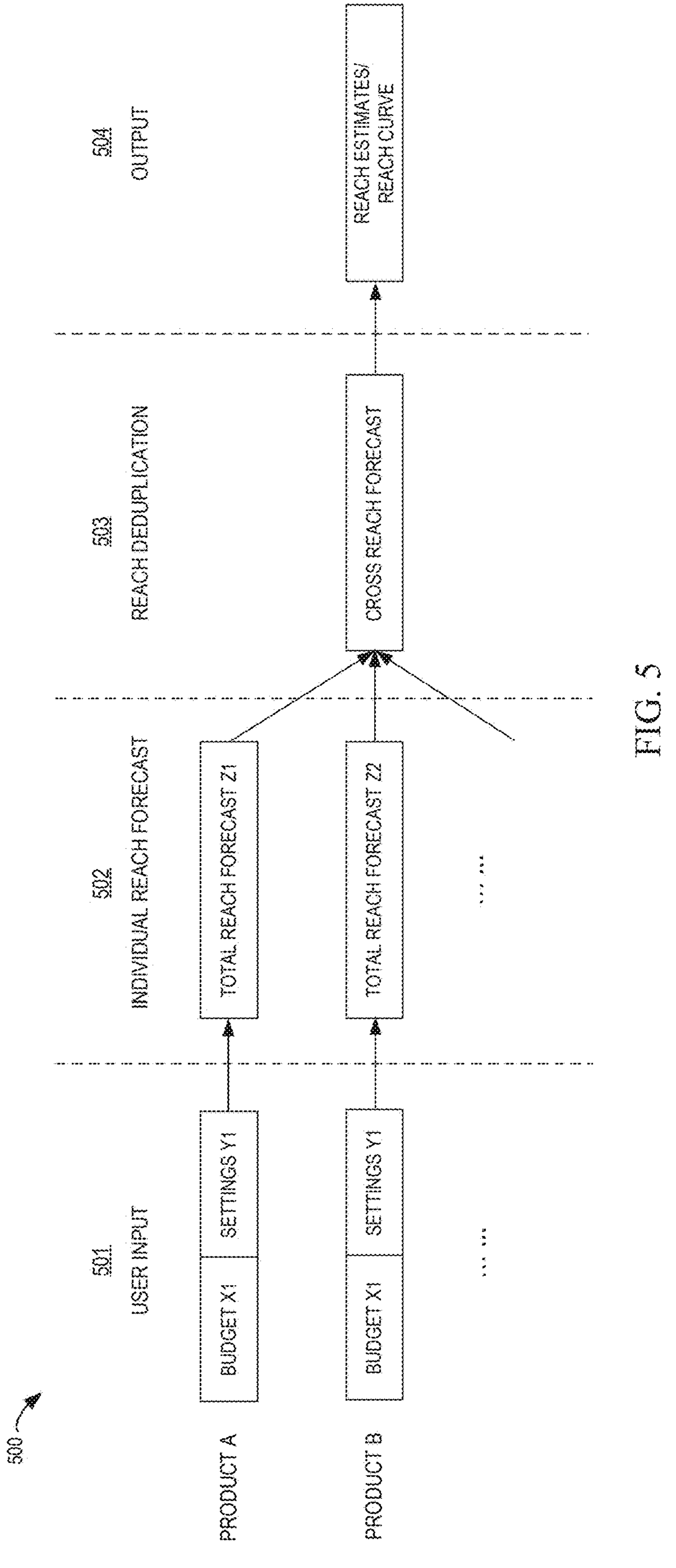
FIG. 5 illustrates an example scenario of reach deduplication across contents in accordance with some embodiments of the present disclosure.

The process 300 for reach deduplication across contents may be applied in any suitable scenarios. FIG. 5 shows an example application scenario 500 of reach deduplication across contents according to some embodiments of the present disclosure. In this scenario 500, cross reach forecasts are performed across advertisements of a plurality of products including products A and B. At stage 501, user inputs such as budget and advertisement settings for the products are obtained. The settings may be related to a duration, a frequency and targeted objects. At stage 502, reach forecasts of the individual products may be acquired based on user specified budget and advertisement settings. At stage 503, cross reach forecasts may be calculated based on reach forecasts of the individual products acquired in stage 502, for example, by using the process 300 for reach deduplication across contents. At stage 504, reach estimates or a reach curve may be output.

Figure 6:
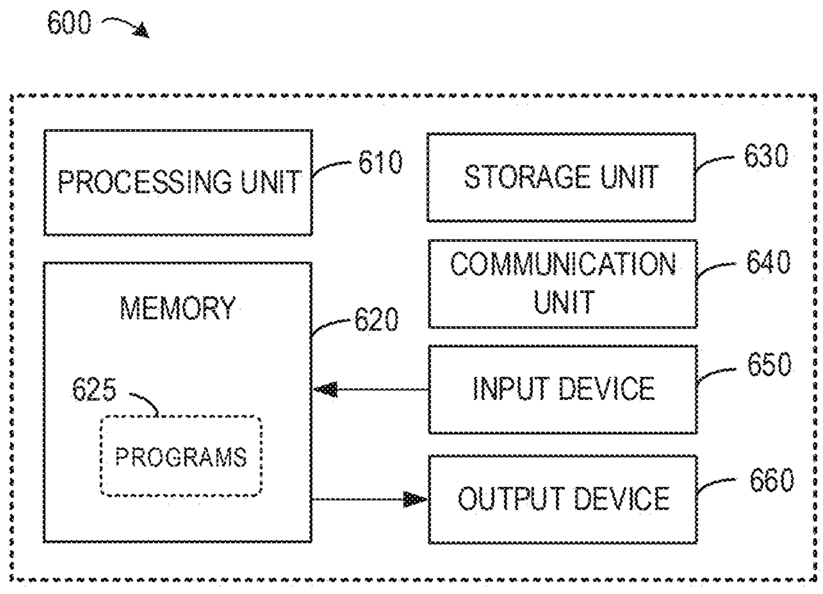
FIG. 6 illustrates a block diagram of an electronic device in which one or more embodiments of the present disclosure can be implemented.

FIG. 6 illustrates a block diagram of an electronic device 600 in which one or more embodiments of the present disclosure can be implemented. It would be appreciated that the electronic device 600 shown in FIG. 6 is only an example and should not constitute any restriction on the function and scope of the embodiments described herein.

As shown in FIG. 6, the electronic device 600 is in the form of a general computing device. The components of the electronic device 600 may include, but are not limited to, one or more processors or processing units 610, a memory 620, a storage device 630, one or more communication units 640, one or more input devices 650, and one or more output devices 660. The processing unit 610 may be an actual or virtual processor and can execute various processes according to the programs stored in the memory 620. In a multi-processor system, multiple processing units execute computer executable instructions in parallel to improve the parallel processing capability of the electronic device 600.

The electronic device 600 typically includes a variety of computer storage medium. Such medium may be any available medium that is accessible to the electronic device 600, including but not limited to volatile and non-volatile medium, removable and non-removable medium. The memory 620 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 630 may be any removable or non-removable medium, and may include a machine-readable medium, such as a flash drive, a disk, or any other medium, which can be used to store information and/or data (such as training data for training) and can be accessed within the electronic device 600.

The electronic device 600 may further include additional removable/non-removable, volatile/non-volatile, transitory/non-transitory storage medium. Although not shown in FIG. 6, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 620 may include a computer program product 625, which has one or more program modules configured to perform various methods or acts of various embodiments of the present disclosure.

The communication unit 640 communicates with a further computing device through the communication medium. In addition, functions of components in the electronic device 600 may be implemented by a single computing cluster or multiple computing machines, which can communicate through a communication connection. Therefore, the electronic device 600 may be operated in a networking environment using a logical connection with one or more other servers, a network personal computer (PC), or another network node.

The input device 650 may be one or more input devices, such as a mouse, a keyboard, a trackball, etc. The output device 660 may be one or more output devices, such as a display, a speaker, a printer, etc. The electronic device 600 may also communicate with one or more external devices (not shown) through the communication unit 640 as required. The external device, such as a storage device, a display device, etc., communicate with one or more devices that enable users to interact with the electronic device 600, or communicate with any device (for example, a network card, a modem, etc.) that makes the electronic device 600 communicate with one or more other computing devices. Such communication may be executed via an input/output (I/O) interface (not shown).

According to example implementation of the present disclosure, a computer-readable storage medium is provided, on which a computer-executable instruction or computer program is stored, where the computer-executable instructions or the computer program is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A method of content management implemented at a content delivery system comprising at least one computer processor, comprising:

obtaining a set of objects to which a plurality of contents are to be delivered;

determining, from the set of objects, a plurality of subsets of objects based on a plurality of object ranges targeted by the plurality of contents to be delivered to the set of objects, an object range of the plurality of object ranges being associated with at least one object attribute and targeted by a content of the plurality of contents, and the plurality of subsets of objects being non-overlapping with each other;

determining, in each of the plurality of subsets of objects, a reference number of objects based on a plurality of individual correlation metrics corresponding to the plurality of contents, at least one of the plurality of contents being to be delivered to the reference number of objects, and an individual correlation metric of the plurality of individual correlation metrics corresponding to a content of the plurality of contents and indicating a probability that the content is delivered to the subsets of objects;

determining, in the set of objects, a target number of objects based on the respective reference numbers determined for the plurality of subsets of objects; and causing delivery of the plurality of contents to the target number of objects.

2. The method of claim 1, wherein determining the reference number of objects comprises:

determining a joint correlation metric for the plurality of contents based on the plurality of individual correlation metrics, the joint correlation metric indicating a degree of correlation between the subset of objects and the plurality of contents; and determining the reference number of objects based on the joint correlation metric and a number of objects in the subset of objects.

3. The method of claim 2, wherein the plurality of contents comprises a first content and a second content, and determining the joint correlation metric for the plurality of contents based on the plurality of individual correlation metrics comprises:

determining a concurrent correlation metric for the first and second contents based on a first individual correlation metric corresponding to the first content and a second individual correlation metric corresponding to the second content, the concurrent correlation metric indicating a degree of correlation between the subset of objects and both the first and second contents; and determining the joint correlation metric based on the first individual correlation metric, the second individual correlation metric and the concurrent correlation metric, wherein the first and second individual correlation metrics have a positive contribution to the joint correlation metric and the concurrent correlation metric has a negative contribution to the joint correlation metric.

4. The method of claim 1, wherein the individual correlation metric of the plurality of individual correlation metrics corresponding to the content of the plurality of contents is determined by:

determining a matching degree between the subset of objects and an object range of the plurality of object ranges targeted by the content;

obtaining a first number of objects in the set of objects, the content being to be delivered to the first number of objects;

determining a second number of objects in one or more subsets of objects of the plurality of subsets of objects corresponding to the object range targeted by the content; and determining the individual correlation metric corresponding to the content based on the matching degree, the first number, and the second number.

5. The method of claim 4, further comprising:

determining whether the content is to be delivered to an object in the set of objects, wherein the matching degree is determined based on the determining whether the content is to be delivered to at least one object in the set of objects.

6. The method of claim 5, wherein a value of the matching degree is determined as zero based on no object in the subset of objects being targeted by the content.

7. The method of claim 1, wherein determining the plurality of subsets of objects based on the plurality of object ranges comprises:

determining an aggregated object range based on the plurality of object ranges;

dividing the aggregated object range into a plurality of object subranges based on object attributes associated with the plurality of object ranges, the plurality of object subranges being non-overlapping with each other; and assigning the set of objects to the plurality of object subranges based on object attributes of the objects, wherein a subset of objects of the plurality of subsets of objects corresponds to an object subrange of the plurality of object subranges.

8. An electronic device, comprising:

at least one processing unit; and at least one memory coupled to the at least one processing unit and storing instructions executable by the at least one processing unit, the instructions, upon execution by the at least one processing unit, causing the electronic device to perform operations comprising:

obtaining a set of objects to which a plurality of contents are to be delivered;

determining, from the set of objects, a plurality of subsets of objects based on a plurality of object ranges targeted by the plurality of contents to be delivered to the set of objects, an object range of the plurality of object ranges being associated with at least one object attribute and targeted by a content of the plurality of contents, and the plurality of subsets of objects being non-overlapping with each other;

determining, in each of the plurality of subsets of objects, a reference number of objects based on a plurality of individual correlation metrics corresponding to the plurality of contents, at least one of the plurality of contents being to be delivered to the reference number of objects, and an individual correlation metric of the plurality of individual correlation metrics corresponding to a content of the plurality of contents and indicating a probability that the content is delivered to the subsets of objects;

determining, in the set of objects, a target number of objects based on the respective reference numbers determined for the plurality of subsets of objects; and causing delivery of the plurality of contents to the target number of objects.

9. The electronic device of claim 8, wherein determining the reference number of objects comprises:

determining a joint correlation metric for the plurality of contents based on the plurality of individual correlation metrics, the joint correlation metric indicating a degree of correlation between the subset of objects and the plurality of contents; and determining the reference number of objects based on the joint correlation metric and a number of objects in the subset of objects.

10. The electronic device of claim 9, wherein the plurality of contents comprises a first content and a second content, and determining the joint correlation metric for the plurality of contents based on the plurality of individual correlation metrics comprises:

determining a concurrent correlation metric for the first and second contents based on a first individual correlation metric corresponding to the first content and a second individual correlation metric corresponding to the second content, the concurrent correlation metric indicating a degree of correlation between the subset of objects and both the first and second contents; and determining the joint correlation metric based on the first individual correlation metric, the second individual correlation metric and the concurrent correlation metric, wherein the first and second individual correlation metrics have a positive contribution to the joint correlation metric and the concurrent correlation metric has a negative contribution to the joint correlation metric.

11. The electronic device of claim 8, wherein the individual correlation metric of the plurality of individual correlation metrics corresponding to the content of the plurality of contents is determined by:

determining a matching degree between the subset of objects and an object range of the plurality of object ranges targeted by the content;

obtaining a first number of objects in the set of objects, the content being to be delivered to the first number of objects;

determining a second number of objects in one or more subsets of objects of the plurality of subsets of objects corresponding to the object range targeted by the content; and determining the individual correlation metric corresponding to the content based on the matching degree, the first number and the second number.

12. The electronic device of claim 11, wherein the operations further comprise:

determining whether the content is to be delivered to an object in the set of objects, wherein the matching degree is determined based on the determining whether the content is to be delivered to at least one object in the set of objects.

13. The electronic device of claim 12, wherein a value of the matching degree is determined as zero based on no object in the subset of objects being targeted by the content.

14. The electronic device of claim 8, wherein determining the plurality of subsets of objects based on the plurality of object ranges comprises:

determining an aggregated object range based on the plurality of object ranges;

dividing the aggregated object range into a plurality of object subranges based on object attributes associated with the plurality of object ranges, the plurality of object subranges being non-overlapping with each other; and assigning the set of objects to the plurality of object subranges based on object attributes of the objects, wherein a subset of objects of the plurality of subsets of objects corresponds to an object subrange of the plurality of object subranges.

15. A non-transitory computer readable storage medium having computer executable instructions stored thereon, the computer executable instructions, when executed by an electronic device, causing the electronic device to perform operations comprising:

obtaining a set of objects to which a plurality of contents are to be delivered;

determining, from the set of objects, a plurality of subsets of objects based on a plurality of object ranges targeted by the plurality of contents to be delivered to the set of objects, an object range of the plurality of object ranges being associated with at least one object attribute and targeted by a content of the plurality of contents, and the plurality of subsets of objects being non-overlapping with each other;

determining, in each of the plurality of subsets of objects, a reference number of objects based on a plurality of individual correlation metrics corresponding to the plurality of contents, at least one of the plurality of contents being to be delivered to the reference number of objects, and an individual correlation metric of the plurality of individual correlation metrics corresponding to a content of the plurality of contents and indicating a probability that the content is delivered to the subsets of objects;

determining, in the set of objects, a target number of objects based on the respective reference numbers determined for the plurality of subsets of objects; and causing delivery of the plurality of contents to the target number of objects.

16. The non-transitory computer readable storage medium of claim 15, wherein determining the reference number of objects comprises:

determining a joint correlation metric for the plurality of contents based on the plurality of individual correlation metrics, the joint correlation metric indicating a degree of correlation between the subset of objects and the plurality of contents; and determining the reference number of objects based on the joint correlation metric and a number of objects in the subset of objects.

17. The non-transitory computer readable storage medium of claim 16, wherein the plurality of contents comprises a first content and a second content, and determining the joint correlation metric for the plurality of contents based on the plurality of individual correlation metrics comprises:

determining a concurrent correlation metric for the first and second contents based on a first individual correlation metric corresponding to the first content and a second individual correlation metric corresponding to the second content, the concurrent correlation metric indicating a degree of correlation between the subset of objects and both the first and second contents; and determining the joint correlation metric based on the first individual correlation metric, the second individual correlation metric and the concurrent correlation metric, wherein the first and second individual correlation metrics have a positive contribution to the joint correlation metric and the concurrent correlation metric has a negative contribution to the joint correlation metric.

18. The non-transitory computer readable storage medium of claim 15, wherein the individual correlation metric of the plurality of individual correlation metrics corresponding to the content of the plurality of contents is determined by:

determining a matching degree between the subset of objects and an object range of the plurality of object ranges targeted by the content;

obtaining a first number of objects in the set of objects, the content being to be delivered to the first number of objects;

determining a second number of objects in one or more subsets of objects of the plurality of subsets of objects corresponding to the object range targeted by the content; and determining the individual correlation metric corresponding to the content based on the matching degree, the first number and the second number.

19. The non-transitory computer readable storage medium of claim 18, wherein the operations further comprise:

determining whether the content is to be delivered to an object in the set of objects, wherein the matching degree is determined based on the determining whether the content is to be delivered to at least one object in the set of objects.

20. The non-transitory computer readable storage medium of claim 15, wherein determining the plurality of subsets of objects based on the plurality of object ranges comprises:

determining an aggregated object range based on the plurality of object ranges;

dividing the aggregated object range into a plurality of object subranges based on object attributes associated with the plurality of object ranges, the plurality of object subranges being non-overlapping with each other; and assigning the set of objects to the plurality of object subranges based on object attributes of the set of objects, wherein a subset of objects of the plurality of subsets of objects corresponds to an object subrange of the plurality of object subranges.

* * * * *